(12) United States Patent
Li et al.

(10) Patent No.: US 10,271,387 B2
(45) Date of Patent: Apr. 23, 2019

(54) PRINTING A DUPLEX MICROWAVE INTERACTIVE SUSCEPTOR STRUCTURE ON CELLULOSE-BASED SUBSTRATES FOR SUSTAINABLE MICROWAVE PACKAGING

(71) Applicant: FPINNOVATIONS, Pointe-Claire (CA)

(72) Inventors: Tingjie Li, Pointe-Claire (CA); Joseph Stephen Aspler, Kirkland (CA); Lyne M. Cormier, Kirkland (CA)

(73) Assignee: FPInnovations, Pointe-Claire (CA)

( * ) Notice: Subject to any disclaimer, the term of this patent is extended or adjusted under 35 U.S.C. 154(b) by 687 days.

(21) Appl. No.: 14/818,479

(22) Filed: Aug. 5, 2015

(65) Prior Publication Data

US 2016/0044749 A1    Feb. 11, 2016

Related U.S. Application Data

(60) Provisional application No. 62/033,685, filed on Aug. 6, 2014.

(51) Int. Cl.
*H05B 6/64* (2006.01)
*H05B 6/80* (2006.01)
(Continued)

(52) U.S. Cl.
CPC .......... *H05B 6/6494* (2013.01); *B29C 59/02* (2013.01); *B65D 81/3446* (2013.01); *H05B 6/6408* (2013.01); *B29K 2001/00* (2013.01); *B29L 2031/712* (2013.01); *B29L 2031/779* (2013.01); *B65D 2581/3443* (2013.01); *B65D 2581/3452* (2013.01); *B65D 2581/3464* (2013.01)

(58) Field of Classification Search
CPC .... H05B 6/6494; H05B 6/6408; B29C 59/02;
B65D 81/3446; B65D 2581/3443; B65D 2581/3452; B65D 2581/3464; B29L 2031/779; B29L 2031/712; B29K 2001/00
USPC ........ 219/730, 732, 759, 728, 729; 428/728, 428/328, 349, 461; 426/107, 234, 241, 426/243, 113, 124, 126; 99/DIG. 14, 451
See application file for complete search history.

(56) References Cited

U.S. PATENT DOCUMENTS

| | | | |
|---|---|---|---|
| 4,914,266 A | 4/1990 | Parks et al. | |
| 4,940,867 A * | 7/1990 | Peleg ................. | B65D 81/3453 219/730 |

(Continued)

FOREIGN PATENT DOCUMENTS

| | | |
|---|---|---|
| CA | 2048343 | 2/1992 |
| CA | 1333493 | 12/1994 |

(Continued)

OTHER PUBLICATIONS

ISR of corresponding PCT/CA2015/050734.

*Primary Examiner* — Quang T Van
(74) *Attorney, Agent, or Firm* — Norton Rose Fulbright Canada

(57) ABSTRACT

The present invention relates to a microwave interactive susceptor structure for the microwave heating of food products. In one aspect, the invention relates to a duplex design for the microwave interactive structure on cellulose-based substrates. In another aspect, the invention relates to a method of patterning the duplex microwave interactive structure on the substrates using a printing press with or without an alignment function.

8 Claims, 7 Drawing Sheets

(51) Int. Cl.
*B65D 81/34* (2006.01)
*B29C 59/02* (2006.01)
*B29L 31/00* (2006.01)
*B29K 1/00* (2006.01)

(56) References Cited

U.S. PATENT DOCUMENTS

| | | | |
|---|---|---|---|
| 5,175,031 A | * | 12/1992 | Ochocki ................ B32B 27/18 |
| | | | 219/730 |
| 5,185,506 A | | 2/1993 | Walters |
| 5,308,009 A | | 5/1994 | Mizuno |
| 2006/0138128 A1 | | 6/2006 | Cole et al. |
| 2007/0084860 A1 | | 4/2007 | Corcoran, Jr. |
| 2007/0145045 A1 | | 6/2007 | Middleton et al. |

FOREIGN PATENT DOCUMENTS

| | | |
|---|---|---|
| WO | 9305625 | 3/1993 |
| WO | 2009137642 | 11/2009 |

* cited by examiner

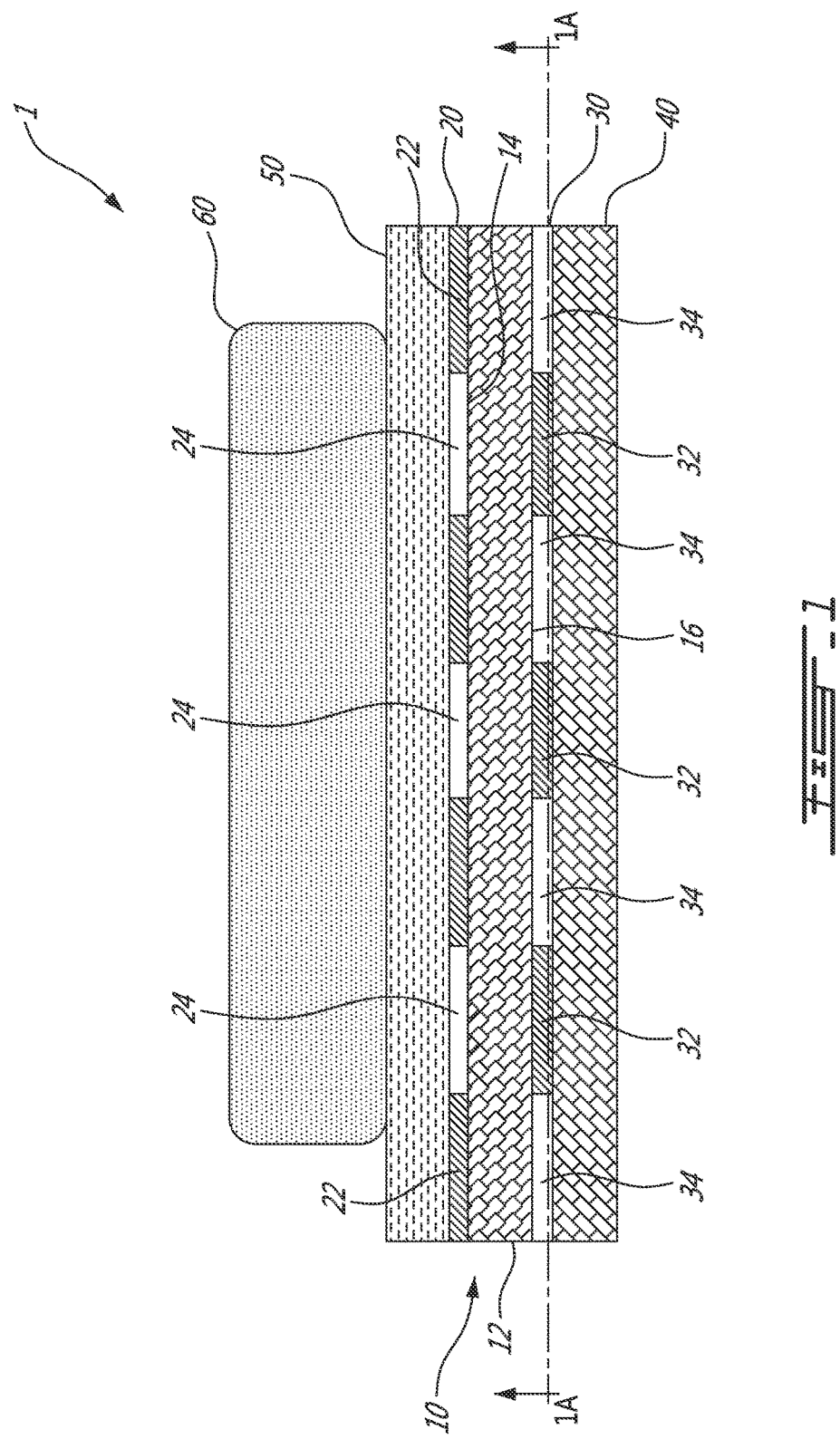

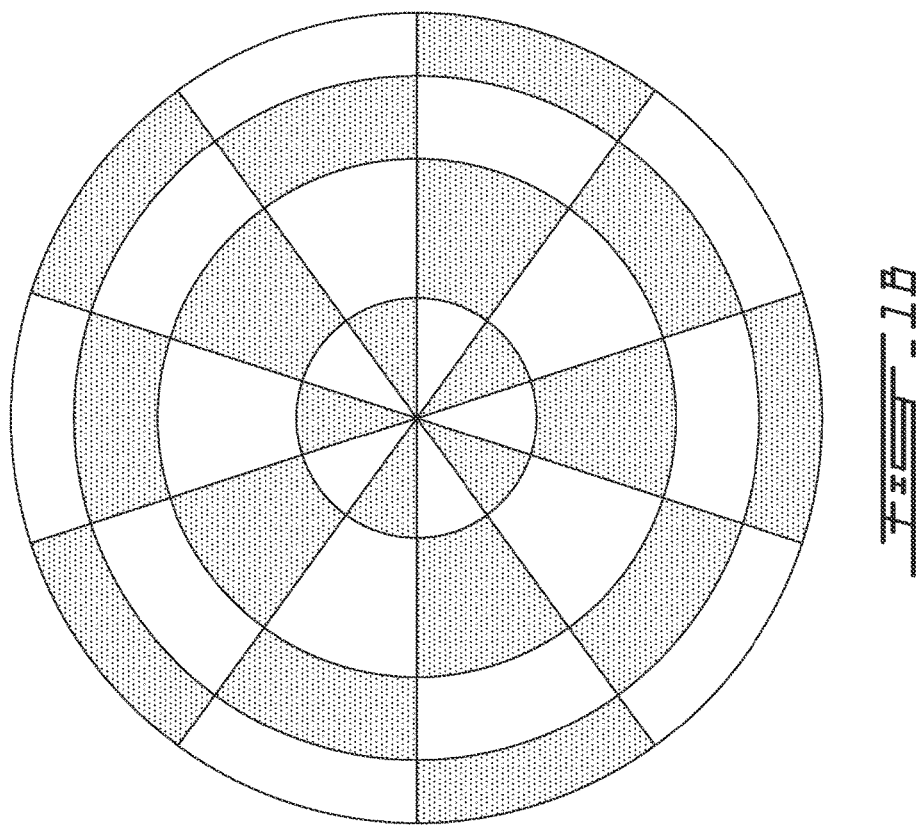

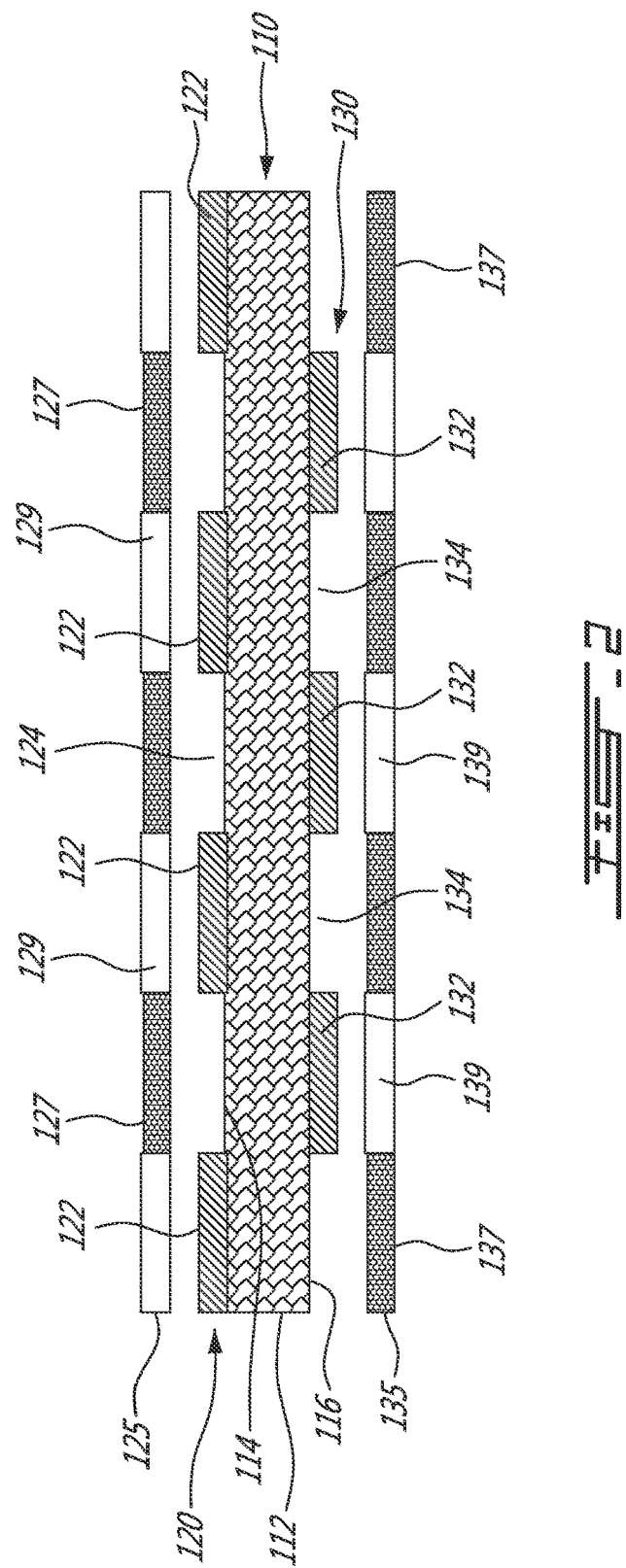

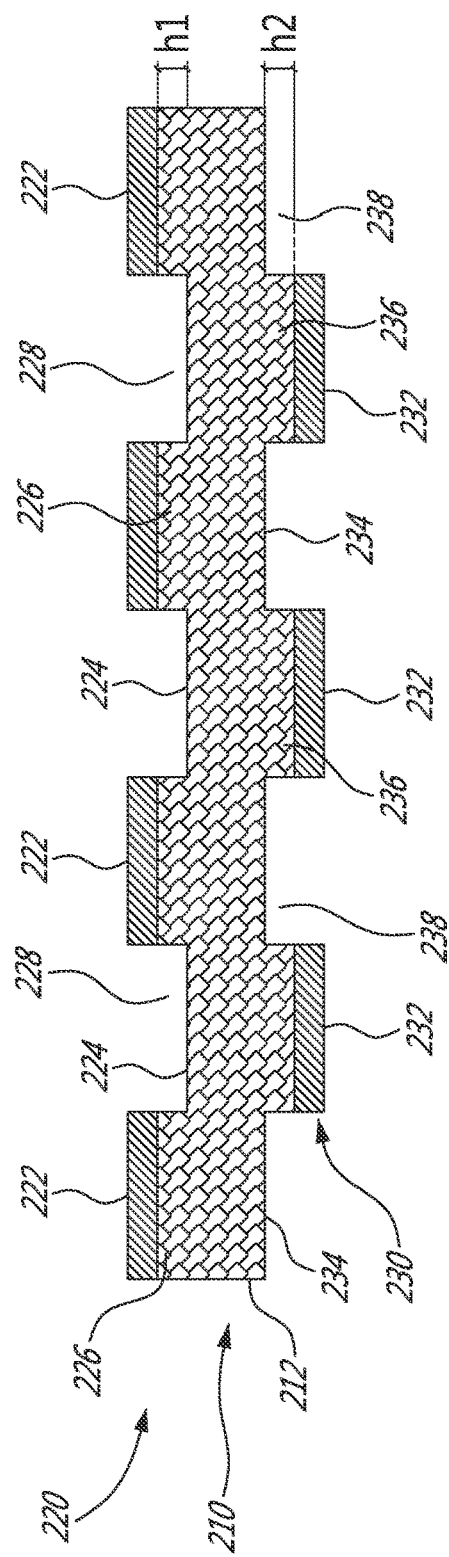

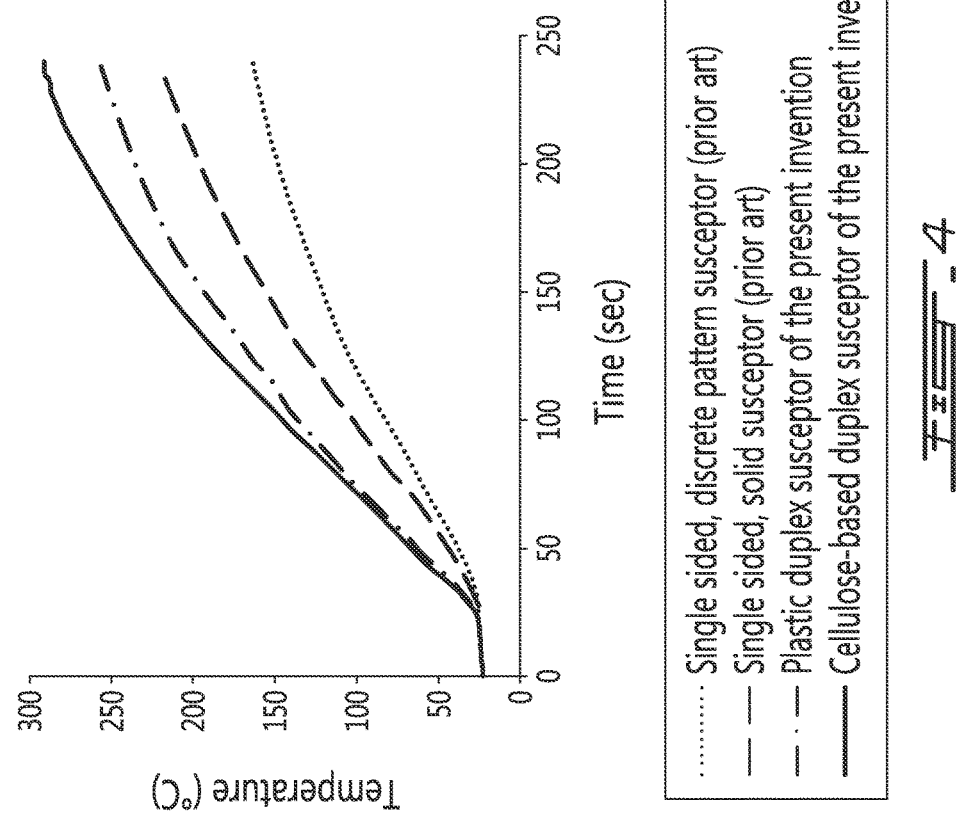

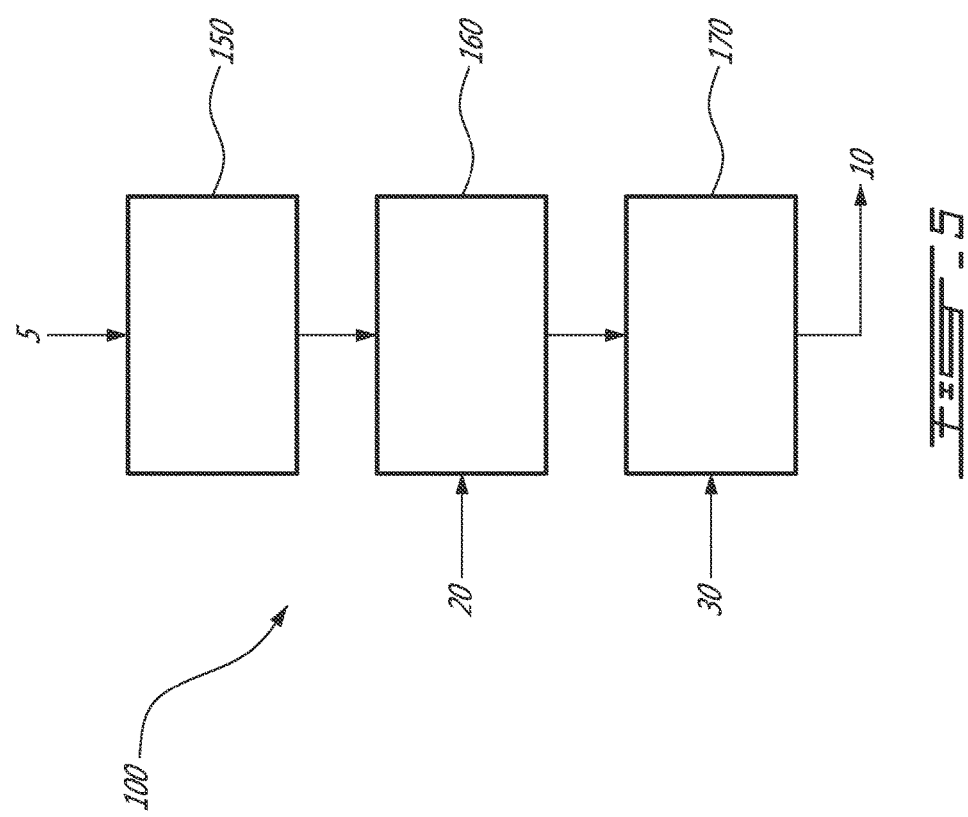

PRINTING A DUPLEX MICROWAVE INTERACTIVE SUSCEPTOR STRUCTURE ON CELLULOSE-BASED SUBSTRATES FOR SUSTAINABLE MICROWAVE PACKAGING

BACKGROUND OF THE INVENTION

Field of the Invention

Active microwave packaging is a class of microwaveable food containers, including bags and boxes that use microwave interactive materials (susceptors) to enhance cooking performance. The susceptor layers are the key to active microwave packages because they convert microwave radiation to heat. These are currently made of metallized plastic films laminated or inserted inside the packages. Although such metallized plastic film susceptors are widely used in the microwave food packaging market, this technology still has performance and recyclability/compostability issues. For example, the metal layer is typically 5 to 10 nm thick, which cannot produce enough heat for some applications. However, if the thickness increases, this metal layer reflects the microwave radiation rather than converting the microwave energy to heat. Another technical issue for the metal film is that it easily breaks down when it is heated, due to its ultra-small thickness. Although the breakdown of metal films can be designed as a safety feature to avoid overheating, it does limit the upper temperature that the metalized film can reach.

Novel susceptor fabrication technology derived from conventional material deposition techniques such as printing and coating onto cellulose-based substrates would help this market grow, as it would provide a potentially low-cost and green alternative to metallized plastic films. However, although the concept of printed susceptors has been patented (U.S. Pat. No. 4,914,266), it has not yet been commercialized. The reason is that printed susceptors still have performance issues, particularly the potential safety issues caused by "runaway heating", which can result in the package catching fire. One possible solution to this critical issue is to print discrete susceptor areas interspersed with areas that do not interact with the microwave radiation (U.S. Pat. No. 5,308,009). The size of the microwave non-interactive pattern is recommended to be the similar size as the interactive pattern, to avoid the occurrence of arcing on two adjacent interactive patterns (US Patent Application 2006/0138128). Overall, one key criterion for good susceptor performance is the ability to reach a safe upper temperature limit at which a steady state absorption of microwave energy occurs. Recyclability or compostability of susceptors could also be an important asset.

SUMMARY OF THE INVENTION

In accordance with one aspect of the present invention, there is provided a microwave interactive susceptor duplex structure comprising: a substrate layer including, a first surface and a second surface opposite each other, a first functional susceptor pattern on the first surface comprising: first microwave interactive areas interspersed by first non-microwave interactive areas, and a second functional susceptor pattern on the second surface comprising: second microwave interactive areas interspersed by second non-microwave interactive areas. In a preferred embodiment the substrate layer is cellulose-based.

In accordance with one aspect of the duplex structure herein described, the first functional susceptor pattern and the second functional susceptor pattern are staggered such that the first microwave interactive areas on the first surface are substantially opposite the second non-microwave interactive areas on the second surface.

In accordance with another aspect of the duplex structure herein described, the first microwave interactive areas and the second microwave interactive areas are a substantially similar pattern.

In accordance with yet another aspect of the duplex structure herein described, the first microwave interactive areas and the second microwave interactive areas are both a microwave interactive ink layer.

In accordance with still another aspect of the duplex structure herein described, the microwave interactive ink layer of the first microwave interactive areas and the second microwave interactive areas are the same.

In accordance with another aspect of the present invention, there is provided a multilayer microwave susceptor composite for enclosing a foodstuff to be heated, the composite comprising: a substrate layer including, a first surface and a second surface opposite each other; a first functional susceptor pattern on the first surface comprising: first microwave interactive areas interspersed by first non-microwave interactive areas, and a second functional susceptor pattern on the second surface comprising: second microwave interactive areas interspersed by second non-microwave interactive areas, a top ply layer, wherein the top ply layer is in contact with the food on the first surface, and a bottom layer on the second surface. In a preferred embodiment the substrate layer is cellulose-based. In a preferred embodiment the second surface includes graphical printing.

In accordance with still another aspect of the duplex structure herein described, the first functional susceptor pattern and the second functional susceptor pattern are staggered such that the first microwave interactive areas on the first surface are substantially opposite the second non-microwave interactive areas on the second surface.

In accordance with yet still another aspect of the duplex structure herein described, the top ply layer is paper or other foodstuff safe layer.

In accordance with yet another aspect of the present invention, there is provided a method for producing a microwave interactive susceptor duplex structure comprising: providing a substrate layer including a first surface and a second surface opposite each other; producing a first functional susceptor pattern on the first surface by depositing a first microwave interactive material onto the first surface with first microwave interactive areas interspersed by first non-microwave interactive areas, and producing a second functional susceptor pattern on the second surface by depositing a second microwave interactive material onto the second surface with second microwave interactive areas interspersed by second non-microwave interactive areas. In a preferred embodiment the substrate layer is cellulose-based.

In accordance with a further aspect of the duplex structure herein described, the first functional susceptor pattern and the second functional susceptor pattern are staggered such that the first microwave interactive areas on the first surface are substantially opposite the second non-microwave interactive areas on the second surface.

In accordance with still another aspect of the present invention, there is provided the method for producing a microwave interactive susceptor duplex structure comprising: providing a substrate layer including a first surface and a second surface opposite each other; providing a first flexographic (flexo) printing plate comprising a first printing pattern with a first microwave interactive material; providing a second flexo printing plate comprising a second printing pattern with a second microwave interactive material; aligning the first printing plate and the second printing plate for making the first printing pattern on the first surface substantially opposite the second printing pattern on the second surface; flexo printing the first microwave interactive material on the first surface from the first plate; and flexo printing the second microwave interactive material on the second surface from the second plate. In a preferred embodiment the substrate layer is cellulose-based.

In accordance with yet a further aspect of the duplex structure herein described, the flexo printing of the first surface and the second surface such that the first microwave interactive areas and the second microwave interactive areas are staggered.

In accordance with still a further aspect of the duplex structure herein described, the flexo printing plates comprise a pattern of the microwave interactive areas to be printed.

In accordance with still a further aspect of the duplex structure herein described, the first printing pattern and the second printing pattern are the same or different.

In accordance with yet still a further aspect of the duplex structure herein described, the first microwave interactive material and the second microwave interactive material are the same.

In accordance with still another aspect of the present invention, there is provided the method for producing a microwave interactive susceptor duplex structure comprising: providing a cellulose-based substrate layer including a first surface and a second surface opposite each other; providing a first shielding mask layer (that is, a stencil layer) comprising a first pattern defining a first plurality of open areas; providing a second shielding mask layer comprising a second pattern defining a second plurality of open areas; placing the first shielding mask layer on the first surface of the cellulose-based substrate layer; placing the second shielding mask layer on the second surface of the cellulose-based substrate layer; placing the first surface and the first shielding mask upward, and flexo printing a first microwave interactive material on the first surface through the first shielding mask, wherein the flexo printing producing the first pattern of first microwave interactive areas on the first surface corresponding to the first plurality of open areas; placing the second surface and the second shielding mask upward, and flexo printing a second microwave interactive material on the second surface through the second shielding mask, wherein the flexo printing producing the second pattern of second microwave interactive areas on the second surface corresponding to the second plurality of open areas.

In accordance with still a further aspect of the duplex structure herein described, the flexo printing of the first surface and the second surface such that the first microwave interactive areas and the second microwave interactive areas are staggered.

In accordance with still a further aspect of the duplex structure herein described, the printing plate comprises large solid area(s) are free of the pattern.

In accordance with yet still another aspect of the present invention, there is provided a method for producing a microwave interactive susceptor duplex structure comprising: providing a cellulose-based substrate layer including a first surface and a second surface opposite each other; providing a first mold comprising a first pattern defining a first plurality of depressed areas; providing a second mold comprising a second pattern defining a second plurality of depressed areas; embossing the first pattern on the first surface of the cellulose-based substrate layer with the first mold to produce a first textured structure of a first plurality of elevated areas corresponding to the first plurality of depressed areas of the first mold; embossing the second pattern on the second surface of the cellulose-based substrate layer with the second mold to produce a second textured structure of a second plurality of elevated areas corresponding to the second plurality of depressed areas of the second mold; flexo printing a first microwave interactive material on the first plurality of elevated areas to produce first microwave interactive areas; and flexo printing a second microwave interactive material on the second plurality of elevated areas to produce second microwave interactive areas, wherein the flexo printing of the first textured surface and the second textured surface such that the first microwave interactive areas and the second microwave interactive areas are staggered.

In accordance with still a further aspect of the duplex structure herein described, the flexo printing plate comprises large solid area(s) free of the pattern.

BRIEF DESCRIPTION OF THE DRAWINGS

FIG. 1 is a cross-sectional view across a multilayer structure including a duplex susceptor structure according to one embodiment of the present invention;

FIG. 1B is a second pattern of the surface of the susceptor of FIG. 1 in a dartboard pattern through line A-A;

FIG. 2 is a schematic representation a duplex susceptor according to one embodiment of the present invention illustrating a cross sectional view across the duplex susceptor, an upper and lower shielding mask used in producing the susceptor;

FIG. 3 is a schematic representation a duplex susceptor according to another embodiment of the present invention illustrating a cross sectional view across the duplex susceptor, having upper and lower printed surfaces;

FIG. 4 is a graph of Temperature versus Time for heating a tube containing a silicone oil with the susceptors of the prior art and with the duplex susceptors according to one embodiment of the present invention; and FIG. 5 is a block diagram of the process of producing a microwave susceptor according to one embodiment of the present invention.

DETAILED DESCRIPTION

Figure 1A:
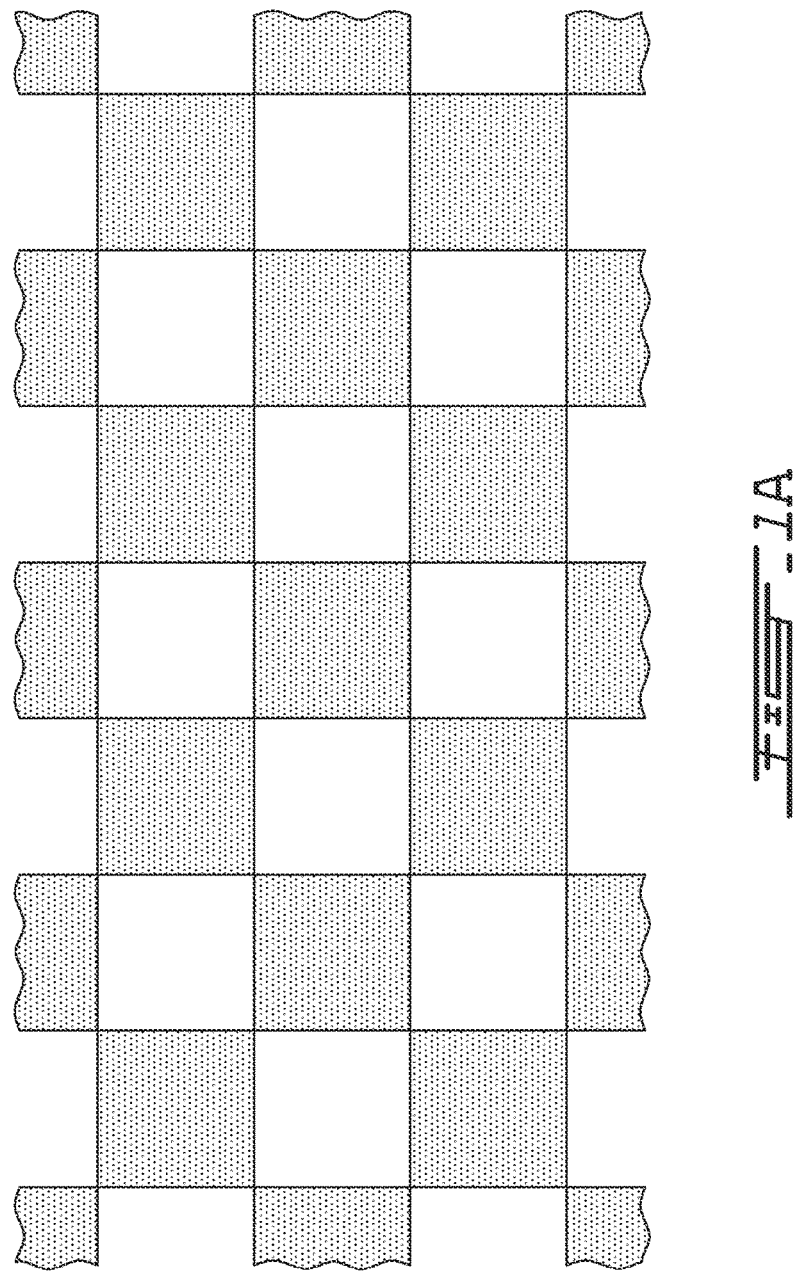
FIG. 1A is a first pattern of the surface of the susceptor of FIG. 1 in a checker board pattern through line A-A.

FIG. 1 illustrates a multilayer susceptor structure 1 that includes a duplex susceptor 10. The multilayer structure 1 can be shaped into a package and used to heat a wide variety of foods and foodstuffs 60.

The duplex structure 10 includes a central layer 12 of a substrate 5 that can be made of a variety of materials, including natural fibers, plastics, man-made fibers, and combinations thereof. In a preferred embodiment the central or core layer/ply 12 of the duplex structure 10 is a cellulose-based material. Cellulose-based material is understood to include cellulose in all its forms and may include a coating and/or fillers both inorganic and organic. In a preferred embodiment the cellulose-based material may be either a low or high basis weight cellulose-based material. Low basis weight cellulose-based paper/material is understood as having a mass per surface area of less than 100 gsm (g/m$^2$). Similarly, high basis weight cellulose-based paper/material is understood as greater than 100 gsm (g/m$^2$). The preferred thickness of the central layer 12 varies from 0.02 mm to 1 mm. In a preferred embodiment the central layer 12 has a thickness of 0.04 mm to 0.3 mm.

The central layer 12 includes a first surface 14 that is an upper surface, and a second surface 16 that is opposite the upper surface, or is the lower surface. The upper and lower surfaces are intermittently printed upon with functional susceptor material in such a manner as to produce plurality of printed areas that define a plurality of first and second microwave interactive areas (22, 32) on the first and second surfaces 14 and 16, while leaving a plurality of other areas unprinted. The unprinted areas define a plurality of first and second non-microwave interactive areas (24, 34).

To produce the multilayer susceptor structure 1 the duplex susceptor structure 10 is laminated between at least two layers, a bottom layer 40 and a top layer 50. After lamination, there is a clear delineation of a first functional susceptor layer 20 and a second functional susceptor layer 30. The first microwave interactive areas 22 are printed on the first surface 14 and the second interactive areas 32 are printed on the second surface 16.

In a preferred embodiment, the patterns on the first and second surfaces 14 and 16 are substantially similar patterns or identical patterns, that although similar are staggered on the two opposite surfaces 14 and 16. The staggering is such, that the patterns are placed such that the first microwave interactive areas 22 are substantially opposite and aligned with the second non-microwave interactive areas 34. That is to say the first microwave interactive areas 22 are generally non-aligned with the second microwave interactive areas 32. It is clear that this alignment of patterns on the first and second surfaces 14 and 16 of the duplex susceptor structure 10 may not be perfect. Although less preferred the first microwave interactive areas 22 may be partially aligned with the second microwave interactive areas 32. In another embodiment the patterns made of the first microwave interactive areas 22 and second microwave interactive areas 32 are completely different patterns thus precluding alignment of the patterns.

The thicknesses of the first and second microwave interactive areas (22, 32) are from 0.5 to 10 microns, and are in a preferred embodiment, from 1 to 5 microns.

FIGS. 1a and 1b illustrate possible patterns of the microwave interactive material. The central layer 12 is patterned on both sides of the substrate and spatially staggered. In a preferred embodiment the substrate of the central layer may include non-flammable additives (e.g. sodium silicate) to further reduce the likelihood of ignition.

This three layer structure of FIG. 1 is called a duplex susceptor 10. The microwave interactive material is isolated into defined patterns but still covers a large portion or the majority of the surface of the cellulose-based substrate. In a preferred embodiment up to 50% of each of the areas of the surfaces 14 and 16 are patterned with microwave interactive material. In a particularly preferred embodiment more than 50% of each of the areas of the surfaces 14 and 16 are patterned with microwave interactive material. The duplex susceptor microwave interactive areas may comprise an electroconductive or semiconductive material, for example, a metallic ink/paste, an organic ink paste, or any combination thereof.

The multilayer susceptor structure 1 also includes a top layer 50 and a bottom layer 40 that are laminated onto the duplex structure 10. The multilayer susceptor structure 1 of the present invention may include more than one of each of a bottom and top layers 40 and 50.

The top layer 50 is a food barrier layer, that may be a cellulose-based film with high grease resistance or a printed layer of any FDA approved material for high temperature (around 100° C. to 300° C.) such as polyester, silicone, etc. The upper layer 50 will become the inner layer of a package that will retain and be in contact with the foodstuff 60 to be heated. The upper layer 50 is constructed of a material compatible with the foodstuff 60 to be heated.

The bottom layer 40 will become an outer layer for the package may be constructed in paper, paperboard or another acceptable non-microwave interactive material. The bottom layer 40, here will be made of appropriate material for graphic printing.

The multilayer susceptor structure 1 illustrated FIG. 1 includes a first and a second functional susceptor layer 20 and 30 produced (respectively) between the first surface 14 and the top layer 50; and the second surface 14 and the bottom layer 40. These two functional susceptor layers 20 and 30 each have microwave interactive areas 22, 32 and define non-microwave interactive areas 24, 34 where there is an absence of microwave interactive material. The thicknesses of the functional susceptor layers 20 and 30 may be the same or may differ and is in the range of 0.5 microns and 10 microns. The present invention also provides a method of flexo printing the duplex microwave interactive structure 10 onto a central core 12 of a low or high-basis weight cellulose-based substrate using patterned printing plates and a flexo press with alignment function. The first susceptor layer 20 can be deposited on the first surface 14 using the first patterned printing plate at the first printing station; the second susceptor layer 30 can be deposited on the second surface 16 using the second patterned printing plate at the second printing station. As previously, described the first and the second printing plates may be arranged to be aligned, slightly misaligned, and unaligned with one another one their respective surfaces. In a preferred embodiment the first and the second printing plates are arranged to have the microwave interactive areas 22, 32 opposite the non-microwave interactive areas 24, 34.

The present invention also provides a method of flexo printing the duplex microwave interactive structure 110 onto a central core 112 that in a preferred embodiment is of a low-basis weight cellulose-based substrate using solid printing plates and a flexo press without alignment function (as illustrated in FIG. 2). This method can also be used with a high-basis weight cellulose-based substrate. A first (upper) and a second (bottom) shielding masks 125 and 135 are aligned on both sides of the substrates. The shielding masks 125 and 135 have a pattern that will produce a reversed pattern/negative pattern on the first and second surfaces 114 and 116. The shielding masks have a plurality of solid areas 127 and 137 and also define a plurality of opening areas 129 and 139. The opening areas 129 and 139 of the masks allow the microwave interactive materials to be deposited on the first and second surfaces 114 and 116 producing microwave interactive areas 122 and 132. While the closed areas 127 and 137 of the masks block the printing of the microwave interactive materials to surfaces 114 and 116 and produce the plurality of non-microwave interactive areas 124 and 134. Flexo presses can transfer inks made of microwave interactive materials, from solid plates (not illustrated) to the substrate surfaces 114 and 116 with the shielding masks, to form the duplex susceptor structure 110. The plurality of microwave interactive areas 122/132 and non-interactive areas 124/134 together on a first and second surface 112/114 produce the structure of the functional susceptor 120 and 130 respectively.

As previously, described the shielding masks 125 and 135 may be arranged to be aligned, slightly misaligned, and unaligned with one another one their respective surfaces. In a preferred embodiment the shielding masks 125 and 135 are arranged to be substantially opposite and aligned but with the microwave interactive areas 122/132 opposite the microwave non-interactive areas.

In a preferred embodiment, the first surface 114 of the substrate 112 is oriented in an upward direction and flexo printed. Then the lower second surface 116 is inverted so that it is oriented upward and the flexo printed.

The present invention also provides a method of flexo printing the duplex microwave interactive structure 210 onto a central core layer 212 in a preferred embodiment is of a high-basis weight substrate (as illustrated in FIG. 3) using printing plates with large solid areas and a flexo press without alignment function. The central core layer may also be a low-basis weight substrate. The substrate or core layer 212 is first pressed by a mold, an embossing device, or other means of compression to form a textured structure having elevated areas 226 and 236 and compressed lower channel areas 228 and 238 where the lower portion of the first and second surfaces 214 and 216 are visible. The height of these textured features is represented by h1 and h2 in FIG. 3 and are in the range of 50 to 400 microns. Flexo-printers/presses transfer inks made of microwave interactive materials, from solid plates to the elevated areas 226 and 236 of the textured substrates 212, thus forming a plurality of microwave interactive areas 222 and 232 and non-microwave interactive areas 224 and 234. The thicknesses of the first and second microwave interactive areas (222, 232) are from 0.5 to 10 microns, in a preferred embodiment from 1 to 5 micron. The pattern or plurality of microwave interactive and non-microwave interactive areas 222/232 and 224/234 produced on the first and second surface 214 and 216 a first and second functional susceptors 220 and 230 and the duplex susceptor structure 210.

The pattern for the duplex susceptor mentioned above may be in one of a variety of shapes. Preferred shapes include squares, circles, loops, hexagons, rectangles, octagons, and so forth. The sizes and gaps of these patterns may be in the scale of microns to centimeters. Although susceptor patterns can be of many sizes and shapes, for purpose of illustration herein it is assumed that the desired shape is a square and the size of susceptor pattern is equal to the one of non-susceptor pattern. These parameters of susceptor pattern can be further optimized to provide sufficient radiation to reach the desired temperature.

The present duplex susceptor structures 10 maximize the surface coverage of the microwave interactive material, with the material confined in discrete patterns. The larger surface coverage means more energy converted and the energy is evenly distributed over the surface compared to the single side, discrete pattern susceptor. Although not wishing to be limited to a theory, it is believed that discontinuities (the microwave non-interactive areas) of the functional susceptor pattern or layer may help to confine the random flow of eddy currents induced from the interactive particles, reducing the risk of forming hot spots thus reducing the possibility of package ignition may be used.

FIG. 4 illustrates a chart of time versus increasing temperature for the cellulose-based duplex susceptor heating up 5 g of non-microwave absorbing oil (e.g. Dow Corning 210H heat transfer oil) to a higher temperature at a faster speed compared with the single side, solid susceptor and the single side discrete pattern susceptor. A plastic duplex susceptor was prepared by printing both sides of a polyethylene terephthalate plastic (PET) film, as already described for the duplex printing of paper. The heating curves of both types of duplex susceptors linearly increase at the beginning and then gradually level off. Although initially providing similar heat performance to the cellulose-based susceptor, the plastic duplex susceptor started shrinking around 150° C. and partially lost contact to the glass tube that was being heated up. Therefore, the heating curve of plastic susceptor initially lines up with the curve of cellulose-based duplex susceptor but then loses efficiency, as shown in FIG. 4. For this reason, conventional metallized plastic susceptors are adhered to paper/boards for good thermal dimensional stability (US Patent Application 2007/0084860). Therefore, the cellulose-based susceptor can be used independently without other supportive substrate. Regardless of the thermal dimensional stability, the heating profiles of both the cellulose-based duplex susceptor and the plastic duplex susceptor are adjustable by changing the printing parameters. The heating of different zones within the same food container can be customized, by adjusting the thickness and/or pattern of the susceptor layer in each zone. This can be achieved by (for example) changing the susceptor material formulation or other settings during the material deposition process. For example, a food container may have zones for different types of food (eg, meat, potatoes, pasta, vegetables, pastry, etc.). This invention allows the manufacturer to achieve different heating in these different zones, for the same amount of time in the microwave oven.

The flexo printing method shown in FIG. 2 eliminates the needs for flexo plates with patterns as well as the registration control on flexo-printers. It makes the duplex susceptor easily printed on cellulose-based substrates, where low-basis weight substrates are preferred embodiments. The flexo printing method shown in FIG. 3 takes the advantage of the moldability of cellulose-based substrates, where high-basis weight paper are preferred embodiments, and eliminates the need for shielding masks, flexo plates with patterns and the registration function on flexo presses.

Besides providing a full microwave interactive area in an isolated printed pattern, the duplex susceptor 210 on textured layer 212 substrates also provides other advantages for the microwave food packages. For example, a portion of the food is heated up by conductive heat transfer due to direct heat transfer between the food item and the elevated section of the susceptor 210. Another portion of the foodstuff is heated up by convective heat transfer due to the cavity 228 between the food item and the susceptor. This creates a cooking environment closer to the hot air oven. The cavity of the textured structure also provides an absorbent feature to absorb oil, grease, etc. during cooking. Due to the reduced contact area, the food items can be easily separated from the susceptor substrates after cooking in the microwave ovens, eliminating the need for a release layer. The textured pattern on the substrate can speed up the heat dispersion after microwave cooking, reducing the risk of burning the fingers of consumers.

The duplex susceptor 20 can also be deposited onto cellulose-based substrates or non-cellulose substrates using inkjet printing, screen printing, offset printing, spray coating, vacuum deposition and any other alternative material deposition methods.

FIG. 5 illustrates a method 100 for producing a duplex microwave susceptor structure according to one embodiment of the present invention. The first step 150 is providing a substrate that can be a cellulose-based or a non-cellulose based substrate. The substrate 5 is a sheet or film having two surfaces one opposite the other. Step 2, 160 is producing a first functional susceptor pattern by applying a first functional susceptor 20 on a first surface. Step 3, 170 is similar to step 2 where a second functional susceptor pattern is produced by applying a second functional susceptor 30 on a second surface. This process of producing patterns may be sequential or simultaneous performed.

Turning to step 1, the substrate of step 1 in a preferred embodiment is a cellulose-based substrates such as paper or cardboard. However, plastic substrates such as polyethylene terephthalate are also possible. Each has the advantage of the ability to reach a safe upper temperature limit at which steady state absorption of microwave energy occurs. The method 100 can be undertaken in a variety of ways, for example: 1) the substrate is generally flat and a printing plate having a pattern with the micro-interactive areas is applied to the surface; 2) the pattern is created by a mask applied to the substrate while the printing plate applying the microwave interactive areas prints a solid, and 3) the substrate is embossed with a pattern and the plate applying the microwave interactive material has no pattern or is free of a pattern. Conceivably a mask and/or an embossed surface can be used with a patterned plate.

The present invention describes a novel microwave susceptor structure that can provide a full microwave interactive area in an isolated pattern that has the advantages of reducing or preventing the package from catching fire when cooked in the microwave oven. The three printing methods described are designed for printing the microwave interactive materials onto the cellulose-based substrates, simplifying the production and bringing in extra benefits for the susceptor packages.

The invention claimed is:

1. A microwave interactive susceptor duplex structure comprising:
   a cellulose-based substrate layer including,
      a first surface and a second surface opposite each other,
         a first functional susceptor pattern on the first surface comprising:
            first microwave interactive areas interspersed by first non-microwave interactive areas, and
         a second functional susceptor pattern on the second surface comprising:
            second microwave interactive areas interspersed by second non-microwave interactive areas.

2. The duplex structure of claim 1, wherein the first functional susceptor pattern and the second functional susceptor pattern are staggered such that the first microwave interactive areas on the first surface are substantially opposite the second non-microwave interactive areas on the second surface.

3. The duplex structure of claim 1, wherein the first microwave interactive areas and the second microwave interactive areas are a substantially similar pattern.

4. The duplex structure of claim 1, wherein the first microwave interactive areas and the second microwave interactive areas are both a microwave interactive ink layer.

5. The duplex surface of claim 4, wherein the microwave interactive ink layer of the first microwave interactive areas and the second microwave interactive areas are the same.

6. A multilayer microwave susceptor composite for enclosing a foodstuff to be heated, the composite comprising:
   a cellulose-based substrate layer including,
      a first surface and a second surface opposite each other;
      a first functional susceptor pattern on the first surface comprising:
         first microwave interactive areas interspersed by first non-microwave interactive areas, and
      a second functional susceptor pattern on the second surface comprising:
         second microwave interactive areas interspersed by second non-microwave interactive areas,
      a top ply layer, wherein the top ply layer is in contact with the food on the first surface, and
      a bottom layer on the second surface.

7. The composite of claim 6, wherein the first functional susceptor pattern and the second functional susceptor pattern are staggered such that the first microwave interactive areas on the first surface are substantially opposite the second non-microwave interactive areas on the second surface.

8. The composite of claim 6, wherein the top ply layer is paper or other foodstuff safe layer.

* * * * *